(No Model.) 2 Sheets—Sheet 1.
F. B. RAE.
REGULATION OF ELECTRIC CIRCUITS.
No. 467,773. Patented Jan. 26, 1892.
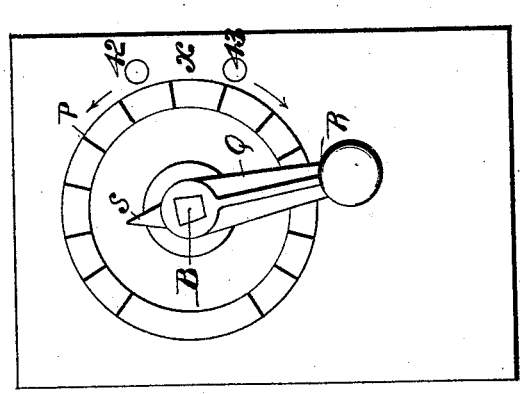
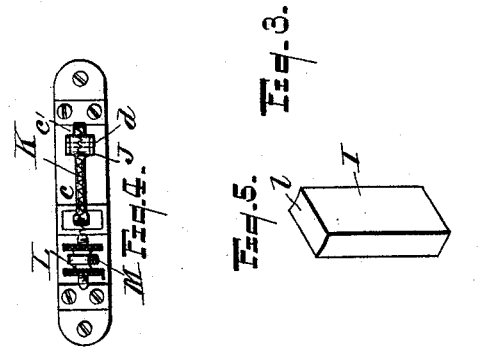
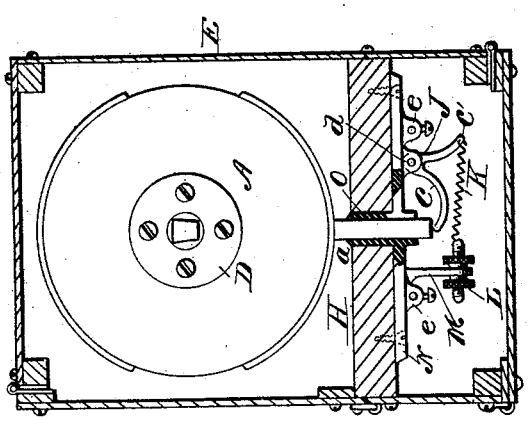
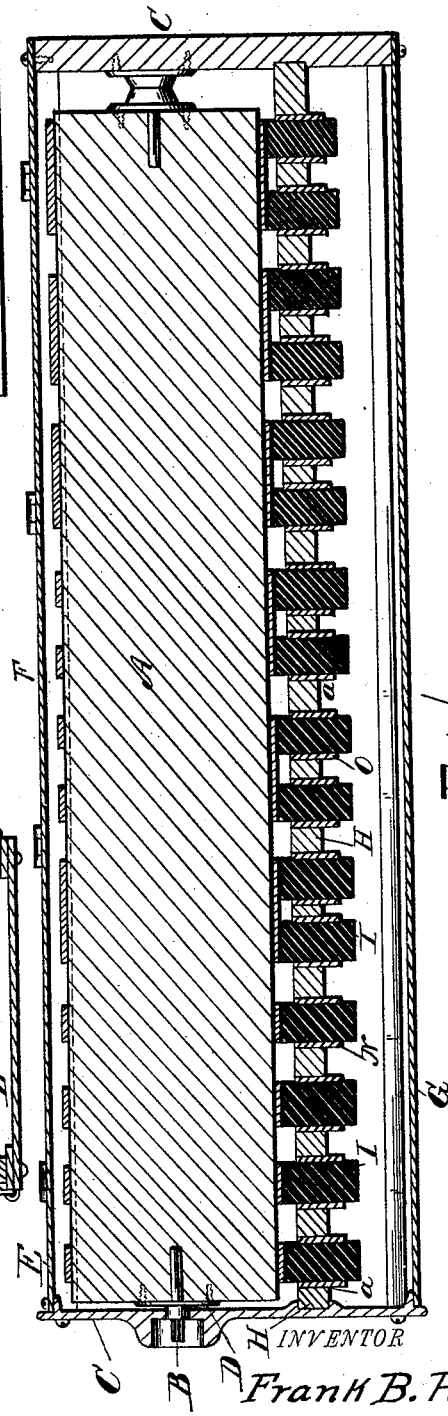
WITNESSES
Samuel E. Thomas
William A. Jackson
INVENTOR
Frank B. Rae (No Model.) 2 Sheets—Sheet 2.
F. B. RAE.
REGULATION OF ELECTRIC CIRCUITS.
No. 467,773. Patented Jan. 26, 1892.
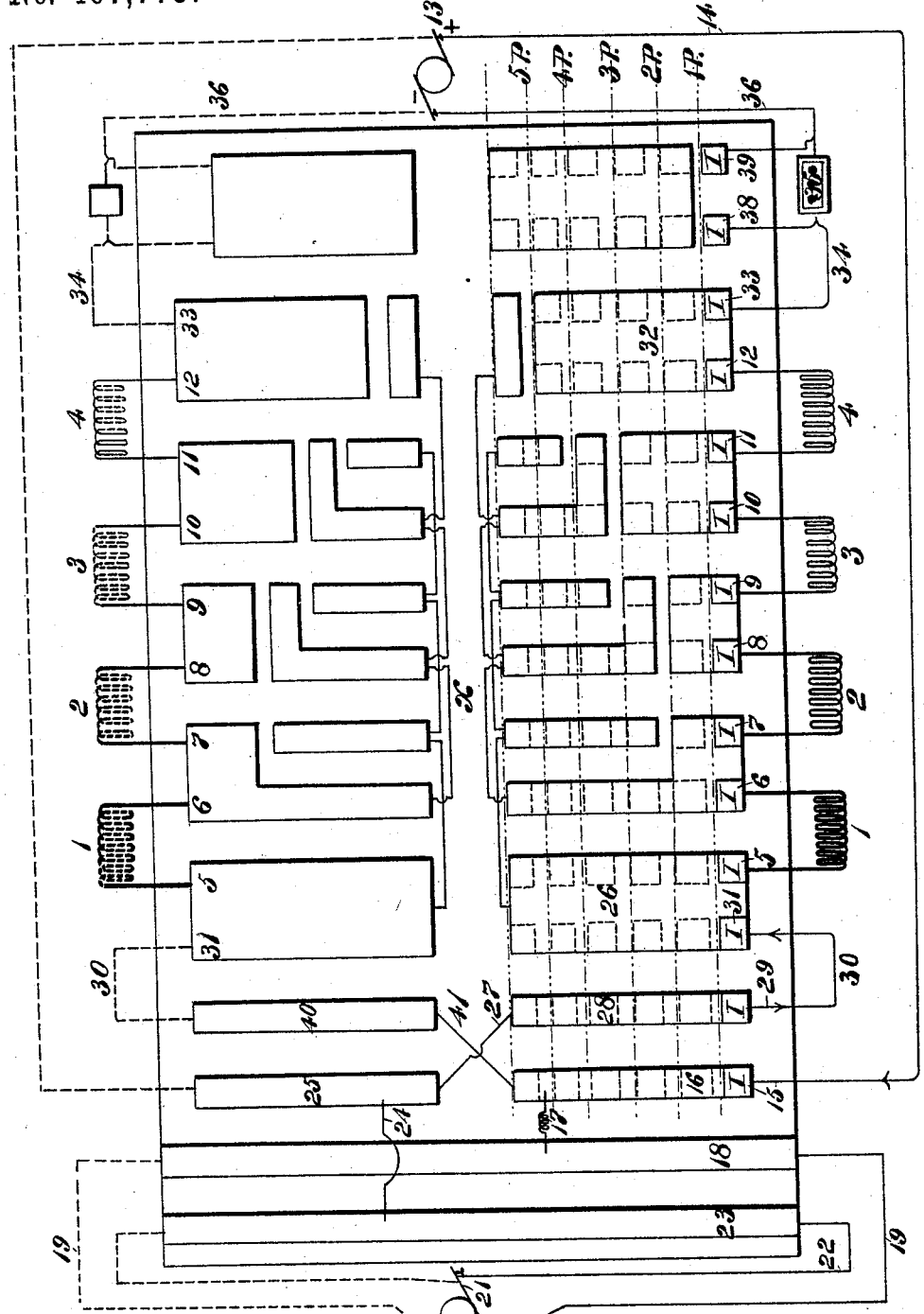
WITNESSES
Samuel E. Thomas
William D. Jackson
INVENTOR
Frank B. Rae.

UNITED STATES PATENT OFFICE.

FRANK B. RAE, OF DETROIT, MICHIGAN, ASSIGNOR TO THE DETROIT ELECTRICAL WORKS, OF SAME PLACE.

REGULATION OF ELECTRIC CIRCUITS.

SPECIFICATION forming part of Letters Patent No. 467,773, dated January 26, 1892.

Application filed May 1, 1889. Serial No. 309,300. (No model.)

*To all whom it may concern:*

Be it known that I, FRANK B. RAE, a citizen of the United States, residing at Detroit, in the county of Wayne and State of Michigan, have invented certain new and useful Improvements in Systems of Regulation for Electric Circuits; and I do hereby declare that the following is a full, clear, and exact description of the invention, which will enable others skilled in the art to which it appertains to make and use the same.

My invention relates in general to a new and improved system of regulation for electric translating and generating devices, but more particularly relates to the regulation of the strength, quantity, and direction of current admitted to the field-magnet circuit of an electric motor or motors deriving electrical energy from a dynamo-electric generator or other source of electricity.

Heretofore, as is well known to those skilled in this art, numerous appliances and methods have been suggested for varying the field-magnet strength of an electric motor, and notably among the number may be mentioned that of interposing adjustable resistance in the field-magnet circuit, reversing the direction of current through said field-magnet circuit, and coupling the different windings comprising the field-magnets in parallel or series, as the case may be, in order to increase or decrease the intensity of the magnetic field.

In order to render my invention particularly and peculiarly practicable for the purpose for which I intend to use the same—*i. e.*, regulation for electric motors mounted upon a traveling vehicle and supplied with current from stationary generators—I have found it necessary to so arrange and construct the component parts thereof as to provide means for either passing the current through the field-magnet circuit in series, partly in series, and partly in parallel, or wholly in parallel, and, further, to reverse the direction of current when occasion may require. By such provision I am enabled to obtain a perfect and reliable regulation of the field-magnet circuit, so that the motor can be readily and conveniently controlled in accordance with the demands of operation.

Accordingly my invention consists, essentially, of an adjustable circuit-controlling and current-regulating switch so devised and constructed as to be operated so that the current admitted to the field-magnet circuit will pass through the field-magnet windings either wholly in series, partly in series, and partly in parallel, or wholly in parallel. Moreover, by means of a peculiar arrangement of my improved switch the direction of the current can be reversed at will without disturbing the relative couplings of the field-magnet windings, and finally suitable resistance can be thrown in the field-magnet circuit when needed. All the electrical connections can be made or broken by a single movement of the operator through the agency of a lever or handle placed within convenient reach and manipulation.

My invention further comprises certain other auxiliary details of construction, arrangement, and combination of parts, all of which will be particularly described hereinafter, and the specific points of novelty in which will be clearly pointed out in the appended claims.

I desire it to be expressly understood that my invention as defined and set forth in its scope by the annexed claims can be readily adapted to purposes other than that illustrated, as will appear hereinafter, and, furthermore, I desire to here state that although the several features and parts shown in the accompanying drawings are adequate and sufficient for successfully carrying out my invention in practice, I am not limited or restricted to the identical features of construction shown, since the fundamental principle inherent herein permits many changes, variations, and substitutions without in the least deviating from the spirit of my invention.

Referring to the accompanying drawings, Figure 1 is a longitudinal central vertical section showing the switch-drum, the contact-plates thereon, the bearing-brushes, the dust-proof casing, and the manner of rotatably mounting the switch-drum in its bearings. Fig. 2 is an end view of Fig. 1, the exterior casing being removed to show the end of the switch-drum and the accompanying parts.

Fig. 3 is an end elevation of Fig. 1, illustrating the operating-handle of the switch and its attached pointer adapted to travel over the face of a graduated dial-plate. Fig. 4 is a top plan view in detail of one of the brushes shown in Fig. 2, together with its adjusting mechanism. Fig. 5 is a detail perspective view of one of my improved carbon contact-brushes shown in Figs. 2, 4, and 6, respectively; and Fig. 6 is a diagrammatical view of the periphery or outer surface of the switch-drum, showing the contact-plates relatively arranged therearound, the bearing-brushes designed to severally bear upon said plates in different positions, and the electrical connections of the plates, the brushes, the generator, and the motor.

Like letters and numbers of reference designate the same or corresponding parts in the several views of the drawings.

Referring now to the drawings, and more particularly to Figs. 1, 2, and 3, A designates a solid wooden roll or drum rotatably mounted in the end plates C C of the casing E by means of the short studs or arbor-shafts D D, secured at the ends of the drum, respectively, coincident with the axial line. This roll A is of the requisite length and diameter to accommodate around its periphery the series of irregularly-shaped contact-plates shown thereon, and is enveloped and protected throughout its entire length by the casing E, consisting of the top and bottom plates F G, respectively, and the end plates C C. This casing may be of any suitable material or construction to meet the requirements of location and operation, and is preferably provided with a hinged lid or flap in the upper plate F, whereby ready access may be gained to the interior of the casing.

Directly above or underneath the switch-drum A, as desired, and in the same plane as the perpendicular axial plane of the drum, is placed a longitudinal slotted plate or beam H, secured at each end to one of the plates C of the casing and provided throughout its length with a series of perforations or slots $a$ $a$, relatively arranged as shown, and in which the brushes I I fit snugly and make contact with the respective plates on the drum A. This construction is clearly shown in Figs. 1 and 2 of the drawings.

By reference to Figs. 2, 4, and 5 it will be seen that each bearing-brush I is substantially in the shape of a rectangular parallelogram having its bearing-surface provided with a slightly-concave recess $b$, which conforms to the curvature of its respective contact-plate, which in turn accords with the curved tread or periphery of the drum A.

In practice I prefer to make each bearing-brush I either wholly of carbon or a compound of carbon and plumbago, so that the friction between the movable contact-plates and said brushes will be reduced to a minimum. Owing to the concave recess $b$ in the face or end of each brush I, the bearing-surface is increased, thereby insuring a more perfect and reliable contact. Since the substance of which these brushes I I are composed lacks resiliency and elasticity, and, further, since it is necessary that the contact between the brushes and the plates must be a yielding or elastic one, it becomes obvious that it is essential to provide means for preserving a yielding pressure between each brush and contact-plate. Accordingly I have shown in Figs. 2 and 4 a spring adjustment for each brush I, whereby the pressure of the latter upon the switch-contacts may be made adjustable and elastic. This device consists simply of a bifurcated arm J, having the curved prongs $c$ $c'$, the former adapted to bear upon the lower end of its respective brush I and the latter attached to one end of a helical spring K, the other extremity of which is secured to the adjusting-screw L, mounted upon and supported by the bracket-arm M. The arm J is pivoted at the point $d$, where the two prongs $c$ $c'$ converge. Thus it will be understood that the tension of the spring K is exerted upon the end of the prong $c'$, causing the prong $c$ to exert its pressure in an upwardly direction against the lower end of the brush I, which latter is capable of a slight vertical reciprocation in the slot $a$ in the plate H. By this construction the pressure of the brushes upon the contact-plates can be adjusted as desired and at the same time the pressure is a yielding or elastic one, owing to the spring K. The length of the plate H is shown in Fig. 1, while its width is illustrated in Fig. 2, and, as will be noticed by an inspection of the latter figure, the under surface of this plate is provided with a number of metallic bed-plates N N, secured thereto, there being one bed-plate N for each brush I, the said bed-plates serving to support the arm J, the adjusting-spring K, the set-screw L, and the binding-posts $e$ $e$.

O indicates a bushing or rectangular flange extending from the body of the bed-plate N through each perforation $a$ in the plate H, thereby forming a lining for each slot $a$ and means for preserving electrical contact with each brush I and the bed-plate N, to which latter is secured the binding-posts $e$ $e$, through which the electrical connections are established with the several field-magnet windings of the motor.

As before stated, each brush fits snugly in its seat in the slot $a$ and in contact with the bushing O, so that perfect electrical continuity is preserved.

P represents a circularly-arranged graduated scale, formed delineated or otherwise, placed on the end of one of the plates C of the casing E, and Q indicates a removable crank-lever keyed rigidly to the shaft B, and consisting of the operating-handle R and the index or pointer S, adapted to move around the face of the graduated scale relatively in accordance with the movement of the handle R. The indices on the face of this scale correspond to the arrangement of the plates on the drum A, so that the operator can ascertain from the position of the pointer on the scale the manner in which the connections are then established through the switch—that is to say, each indicating-mark on the plate corresponds to a particular electrical connection made by the switch in that position. By grasping the handle R and moving the same in any direction the switch-drum and its superincumbent contact-plates are rotated accordingly, and during such rotation the said contact-plates severally establish electrical connection with the series of brushes I I, which in turn are in circuit with the generator and motor, in a manner that will be more fully understood from the explanation given hereinafter.

Referring now to the electrical connections in detail of the current-regulating switch, it is necessary to inspect Fig. 6, wherein I have illustrated the various contact-plates, brushes, and their connections with the motor, field-magnet windings, and generator. The position of the brushes I I (indicated in full lines in Fig. 6) corresponds to the initial position assumed by the switch. This is shown by the longitudinal line marked "Position No. 1" in the drawings. The second position to be assumed by the brushes I I upon the contact-plates is shown by the longitudinal line marked "Position No. 2," and the third, fourth, and fifth positions of said brushes are similarly indicated by like lines marked, respectively, "Positions Nos. 3, 4, and 5." In this particular instance there are four separate field-magnet windings. (Indicated, respectively, by the numbers 1, 2, 3, and 4.) The terminals of each field-magnet winding, respectively, are in circuit with a contact-brush I—that is to say, each one of the two terminals of each field-magnet winding is in circuit with brush I by the binding-posts e e. (See Fig. 2.) Thus as there are four field-magnet windings with two terminals for each winding and a brush I for each terminal there are eight field-magnet brushes I, marked, respectively, in Fig. 6 by the numbers 5 to 12, inclusive. Besides the field-magnet referred to there are others forming the terminals of various other electric circuits from the generator and motor. If the switch be turned to the initial position—i. e., the position shown in full lines of Fig. 6 and marked "Position No. 1"—the current from the + pole of the generator 13 will pass over the outgoing conductor 14 to the brush 15, thence to the contact-plate 16, wire 17, contact-plate 18, conductor 19, commutator-brush 20, through the motor, brush 21, conductor 22 to plate 23, then by wire 24 to plate 25, from which the circuit extends to the plate 26 by wire 27, plate 28, brush 29, wire 30, and brush 31. Then the path of the circuit will continue from the plate 26 to brush 5 on through the several field-magnets 1, 2, 3, and 4, in series, and will pass from the field-magnets through plate 32, brush 33, conductor 34, rheostat 35, return-conductor 36 to the − pole of the generator. Now if the switch be turned to the second position the path of the circuit will be the same, with the exception that the resistance 35 will be shunted out of the circuit, since the two brushes 38 and 39 will be then in contact with the plate 37. Thus in the second position of the switch all the field-magnet windings will be in series without the presence of the resistance 35, whereas in the first position the field-magnets were likewise in series with the resistance 35 in circuit. By turning the switch to its third position it again makes contact with a different set of contact-plates, which latter are so connected together with relation to the circuit already traced that field-magnet windings 1 and 2 will be in multiple arc and the field-magnet windings 3 and 4 will be in series. The fourth position of the switch shows field-magnet winding 1, 2, and 3 in multiple arc and the winding 4 in series, and the fifth position places all four field-magnet windings in multiple arc.

I have not deemed it necessary to trace the path of the current in each and every position of the switch, since I have relied upon previous explanation of the circuits with reference to the first and second positions to enable any one to follow all succeeding positions of the switch.

When it becomes necessary to reverse the direction of current through the armature of the motor, it can be readily effected by turning the switch so that all the contact-brushes I I will bear upon the contact-plates on the other side of the diagram Fig. 6. In other words, to effect this purpose, the switch must be so turned as to bring the brushes 15 and 29, respectively, in contact with the plates 25 and 40, respectively. In such instance the path of the current from the +-pole generator 13 will be as follows: 14, 25, 24, 23, 22, 21, 20, 19, 18, 17, 41, 40, 30, 31, 5, 1, 6, 7, 2, 8, 9, 3, 10, 11, 4, 12, 33, 34, and 36 back to the − pole of the generator, thereby reversing the direction of the current through the armature of the motor.

It will be readily understood that the current can be reversed in the manner described without changing any set position of the switch, or the switch may be changed from one position to another for a dual purpose—viz., that of reversing the current through the armature and changing the electrical connection of the field-magnet.

It is manifest that, in order to preclude the possibility of the current being reversed through the armature by an accidental displacement or operation of the switch-handle, some means should be provided for locking or limiting the position of the switch. Such a device is shown in Fig. 3 of the drawings, and consists simply of the two limiting-pins 42 and 43, which prevents the switch-handle R from being turned across the space marked X in Figs. 3 and 6, so that the reversing operation can only be accomplished by retracting the switch-handle in the direction of the arrows shown in Fig. 3. It will be understood that the field-magnet windings 1, 2, 3, and 4 are of different gage or cross-section, and, this being the case, it will be understood that they are ranged relatively in accordance with the manner in which they may be connected up, so that the strength of the current, whether regulated by series or multiple arc, may not be detrimental to any one winding.

It is apparent that instead of applying my invention for the regulation of field-magnet circuit of an electric motor, the same may be used in connection with storage-batteries, primary batteries, dynamo-machines, inductional converters, and for various other purposes. It is also obvious that the number, arrangement, and location of the contact-plates and their brushes may be changed, increased, or decreased in accordance with the purpose for which my invention is adapted without departing from the spirit of my invention.

My improved switch will be found useful in all cases where the supply of electricity is great and where any electric circuit or circuits is to be varied by differentiating the internal resistance of said circuit or circuits.

Having thus described my invention, what I claim, and desire to secure by Letters Patent, is—

1. The combination, with the source of electric energy of an electric motor the field-magnet of which is provided with a plurality of field-magnet coils, of a circuit-controlling switch consisting of a cylinder provided with a duplicate set of insulated contact-plates arranged substantially as described, a series of brushes arranged to bear on the contact-plates, connections between the contact-plates and the terminals of the field-magnet coils, connections between the armature-coil and current-reversing plates on the switch, and a rheostat and connections between the same and plates on the switch, whereby the current of the motor can be controlled in the manner and for the purposes as hereinbefore set forth.

2. A current-controlling switch for electric motors, consisting of a case inclosing a cylinder, a duplicate series of contact-plates arranged on the cylinder and insulated therefrom and from each other, a single series of spring-pressed brushes bearing on said cylinder, the brushes consisting of blocks of carbon having one edge rounded, substantially as described.

3. The combination of a case inclosing a cylinder having a duplicate series of contact-plates arranged on its surface, of a plate arranged adjacent to the cylinder and having a series of metallic bushings, each provided with a binding-screw, and a spring-pressed carbon-brush fitting each of said bushings and bearing on the face of the cylinder, substantially as described.

In testimony whereof I have hereunto set my hand this 24th day of April, 1889.

FRANK B. RAE.

Witnesses:
BYRON GREEN,
WILLIAM A. JACKSON.